United States Patent
Buyuksahin

(10) Patent No.: US 9,030,653 B1
(45) Date of Patent: May 12, 2015

(54) MULTI POINT, HIGH SENSITIVE TACTILE SENSING MODULE FOR ROBOTS AND DEVICES

(71) Applicant: Utku Buyuksahin, Kadikoy Istanbul (TR)

(72) Inventor: Utku Buyuksahin, Kadikoy Istanbul (TR)

( * ) Notice: Subject to any disclaimer, the term of this patent is extended or adjusted under 35 U.S.C. 154(b) by 0 days.

(21) Appl. No.: 14/391,613

(22) PCT Filed: Oct. 31, 2012

(86) PCT No.: PCT/TR2012/000179
§ 371 (c)(1),
(2) Date: Oct. 9, 2014

(87) PCT Pub. No.: WO2014/011126
PCT Pub. Date: Jan. 16, 2014

(30) Foreign Application Priority Data

Jul. 11, 2012  (TR) .............................. a 2012 08054

(51) Int. Cl.
  *G01B 11/16*  (2006.01)
  *G01L 5/22*   (2006.01)
  *G01L 1/24*   (2006.01)

(52) U.S. Cl.
CPC ................. *G01L 5/226* (2013.01); *G01L 1/242* (2013.01); *G01L 1/248* (2013.01)

(58) Field of Classification Search
CPC ...... A61B 5/01; A61B 5/14546; A61B 5/412; A61B 5/6814; A61B 2560/0214; A61B 2560/0219; A61B 2560/0252; A61B 2560/0418; A61B 2562/0238; A61B 2562/12; A61B 3/1241; A61B 3/16
See application file for complete search history.

(56) References Cited

U.S. PATENT DOCUMENTS

| 5,983,725 A | 11/1999 | Fischer et al. |
| 8,607,629 B2 * | 12/2013 | Higaki et al. .................. 73/160 |
| 2011/0067504 A1 | 3/2011 | Koyama et al. |

OTHER PUBLICATIONS

International Search Report and Written Opinion, dated Jun. 3, 2013, pp. 1-8, issued in International Application No. PCT/TR2012/000179, issued by International Searching Authority European Patent Office, Rijswijk, The Netherlands.
International Preliminary Report on Patentability with Annexes (Amended Claims), dated Jul. 9, 2014, pp. 1-7, issued in International Application No. PCT/TR2012/000179, issued by International Searching Authority European Patent Office, Rijswijk, The Netherlands.

* cited by examiner

*Primary Examiner* — Michael P Stafira
(74) *Attorney, Agent, or Firm* — Brinks Gilson & Lione

(57) ABSTRACT

The features of the system are: fiber optic cables (instead of human sensory receptor) and low cost CMOS or CCD image sensor (which can be found in a conventional webcam, camcorder, digital camera etc.) are used by pairing each pixel of the image sensor with corresponding fiber optic cable, which is assured to transfer all light beams to the processor on a single photo frame where the coordinates and the level of displacements are detected precisely by the aid of image processing techniques, in order to provide tactile sensing. The system can work with a computer or it can work individually with an electronically circuit that contains an independent processor.

7 Claims, 5 Drawing Sheets

MULTI POINT, HIGH SENSITIVE TACTILE SENSING MODULE FOR ROBOTS AND DEVICES

BACKGROUND

1. Technical Field

The disclosure is related to sensors (feedback mechanisms) of robotics and devices.

2. Background Information

It is well known that automation mimics the human body. It is observed that the computation systems for the data acquisition from sensors are basically a simple copy of human brain as well as the sensors are the simple copies of the receptors of the human body. It is clear that the automation systems with less than a hundred years of past, have a long way in order to reach the capability of human body with the experience of hundreds thousands years of evolution.

"Tactile Sensing", which is the topic of the disclosure,— with current technology—is frequently limited to sense an approaching metal or a material that the sensor is sensitive and inform that to main processor by using proximity sensors. As the data which is transmitted by these sensors include only "true" or "false" and they are lack of leveled information, and they are also bulky (few millimeters diameter), these sensors are not efficient for multiple point applications.

Even for most developed humanoids, the technique that is currently being used is very expensive force/torque sensors, that are located on the joints. These sensors measure the contact pressure when an obstacle is in the way of the limb or when an object has been grasped. There exist one or more sensors and data acquisition systems for each limb (arm-elbow joint, fingers, etc.) in this detection/sensation method which costs too much.

For the application when pressure sensors are used the geometrical dimension becomes the issue, again. Even if the geometrical problem is relatively solved than again the transmission of the data to the main processor becomes an issue. Expensive data acquisition cards or microcontrollers are being used for current applications, but when the input numbers reach the level of hundred numbers; these inputs become a constraint/limiting factor. Human body that has been trying to be mimicked includes hundreds of thousands even millions of receptors in the fingertip, as it is known. And human brain processes all the data that are coming from these receptors very fast.

The most recent and similar robotic tactile sensing patent that is related is Koyoma and et. als.'s with number US20110067504A1, which is submitted at May 29, 2008 and published at Mar. 24, 2011. Optocouplers are suggested for tactile sensing, but because of the dimensions of these optocouplers for each fingertip of the humanoid, a single sensor is proposed. It is suggested that by placing one sensor for 5 millimeters with a matrix format will increase the quantity which means 9 sensors for 1 centimeter.

All related and similar patents have the common issues like, low sensitivity, low quantity sensor per one centimeter square (limited to number tens) and the constraints on the data input numbers.

BRIEF SUMMARY

It is intended to increase the number of the quantity of the sensors per one centimeter square up to more than one million. It is also aimed to measure all of these millions of points' per one centimeter displacements each and proses the data fast by avoiding high costs.

BRIEF DESCRIPTION OF THE DRAWINGS

(FIG. 5—"A" direction view)

DETAILED DESCRIPTION OF THE DRAWINGS AND THE PRESENTLY PREFERRED EMBODIMENTS

Every part in the figures are numbered and explained below.

1) Infrared (or normal) light source
2) Infrared (or normal) light receiver.
3) Reflecting light from the obstacle
4) The distance between the light source/receiver and the obstacle.
5) Light reflecting obstacle and the meantime the separator of the system from the surrounding environment.
6) Surrounding environment.
7) Fiber optic cables that carry the light from the source that is placed far from the measuring area.
8) Fiber optic cable that carries the light to the receiver that is placed far from the measuring area.
9) Webcam or a similar digital camcorder or digital camera sensor (CMOS, CCD etc.)
10) Light capturing pixels meant to analyze connected light where each works individually.
11) Light Source (Sum of more than one light source.)
12) Elastic Material
13) Rigid area; where fiber optic cables' tips are located and united with the elastic area, and which prevents the unwanted level of penetration.
14) Shape deformation when an object is penetrated through the elastic area.
15) Bunch of cables consist of number 7 and 8 fiber optic cables.
16) The image that is composed by the sensors corresponding to the area where there is no deformation.
17) The image that is composed by the sensors corresponding to the area where there is deformation.
18) The connection areas that form groups, depending on the different measurement areas through the fiber optic cables that carry the light.
19) Optical system that makes the light beams closer. (Each material that is used in the system is infrared conductive)
20) Intensive bunch of beams of light (closer to each other).

Figure 1:
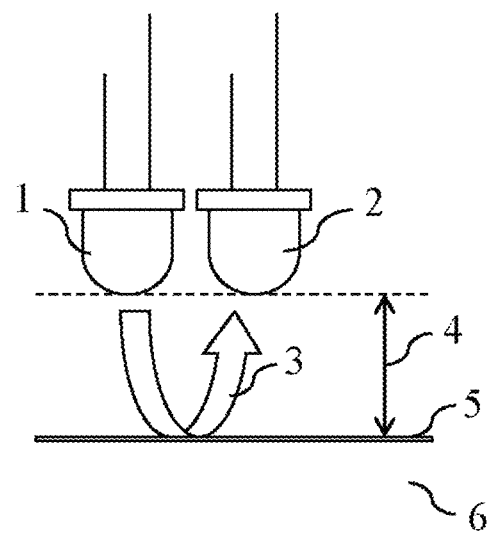
FIG. 1: Optocoupler systems' elements
Figure 2:
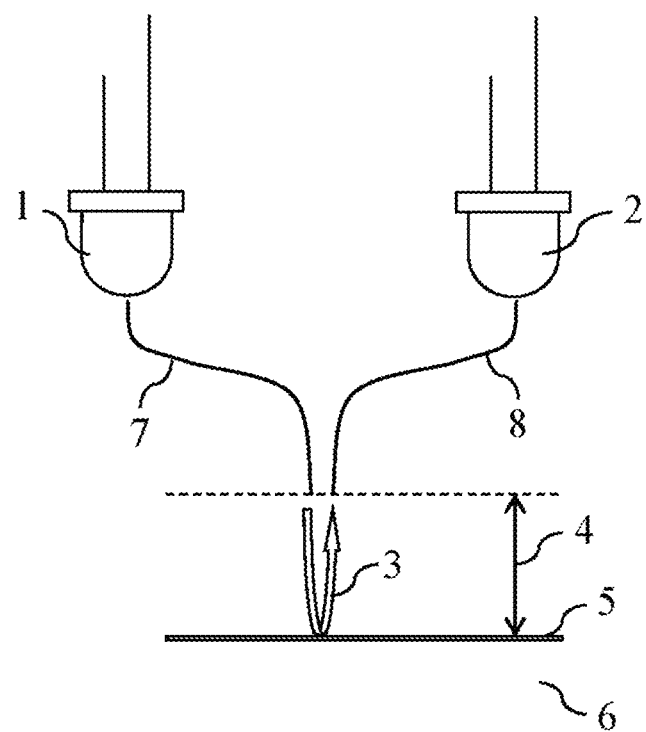
FIG. 2: Symbolical view of the fiber optic cables assembly that is meant to minimize the used area of optocoupler systems' elements
Figure 6:
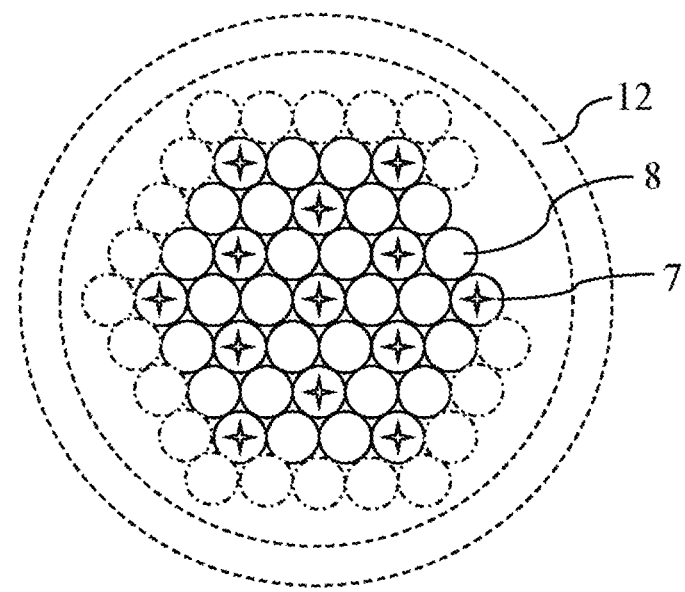
FIG. 6: Array sequence of the fiber optic cables in the sensing area.

Optocouplers are one of the components that are frequently used in circuits of encoders and in other types of electronically circuits to provide electrical isolation. Optocouplers include a normal or infrared light source (1) and a light receptor (2) (FIG. 1). There are different types of optocouplers. Such as; 1/0 which means true or false output type and another type that gives output proportional to the reflecting light intensity. This second type of optocouplers can be used for the embodiments. The beam/ray of light (3) that is delivered by the light source (1) will reflect from the obstacle (5) and will reach to the receptor (2). Depending on the distance between the obstacle and the receptor (4), voltage will be produced, respectively. Thus, measuring the distance(4) would be possible, depending on the measurement of the variation of voltage. Because of each light source's and sensor's diameter which are a few millimeters, usage of multiple optocouplers require a lot of space in conventional designs. The first aim is to enable to place a lot of receptors in a small area by moving away the optocouplers. Fiber optic cables (7) which are infrared conductive and have diameter less than 10 micrometers will carry and deliver the light from the light source (1), meanwhile equivalent fiber optic cables (8) with the same features will carry the reflecting light (3) to the receptor (2) (FIG. 2). Because of the features of the fiber optic cables such as no noise or perturbation effect even if used parallel to each other and being efficiently light conductive even if the cables are bended or twisted, they can easily be used in moving/mobile fields. With current technology, standard infrared conductive fiber optic cables have 9 micrometer diameters. It is calculated that (with the effect of loss areas between the circles) 1.572.327 fiber optic cables can be placed in 1 centimeter square. Each light sensor/receptor requires one light source. With the sequence design in FIG. 6 each fiber optic cable (8) that carries light to a sensor will own 3 fiber optic cables (7) that deliver light from source. By that the number of light delivering fiber optic cables (7) will one fourth of the number of the others (8). If the area loss of circles being next to each other and the loss of light delivering fiber optic cables (7) are taken into account there will be approximately 1.000.000 receptors per 1 centimeter square. In other words there will be 1.000.000 points/pixels that measure the displacement.

Figure 3:
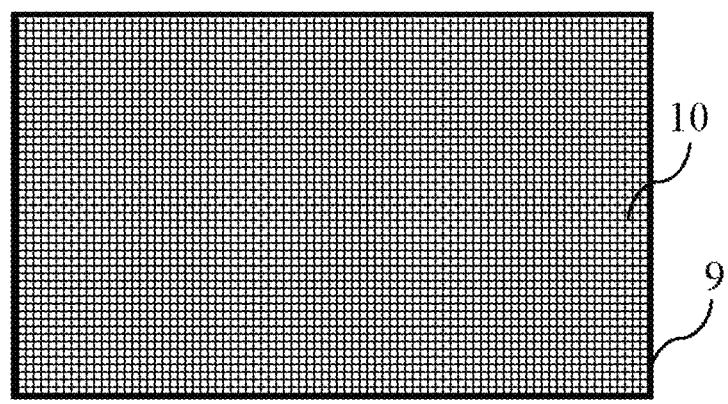
FIG. 3: Symbolical view of image sensors like CCD, CMOS etc.

Not every receptor (1) requires a corresponding light source (11); however each measurement point requires a corresponding receptor (2). Despite the fact that fiber optic cables (7) (8) solve the dimensional issues at the reception area, it results in an issue of an overall system dimension's being huge. But the real problem is acquiring and processing of millions of data rather than the dimensional issue. A voltmeter with one channel can only read one, a two channeled oscilloscope can read two, and a 32 analogues input data acquisition card can read 32 data. Thus, any of these options are neither cost efficient nor close to a convenient answer to the requirement of reading all the data. With this system, CMOS or CCD sensor which can be found in a conventional webcam or a similar camcorder or a digital camera is utilized to overcome above mentioned problem. Main advantage of these kinds of sensors (9) is the feature of containing millions of sensory pixels (10) depending on the resolution of the product. (FIG. 3).

Figure 4:
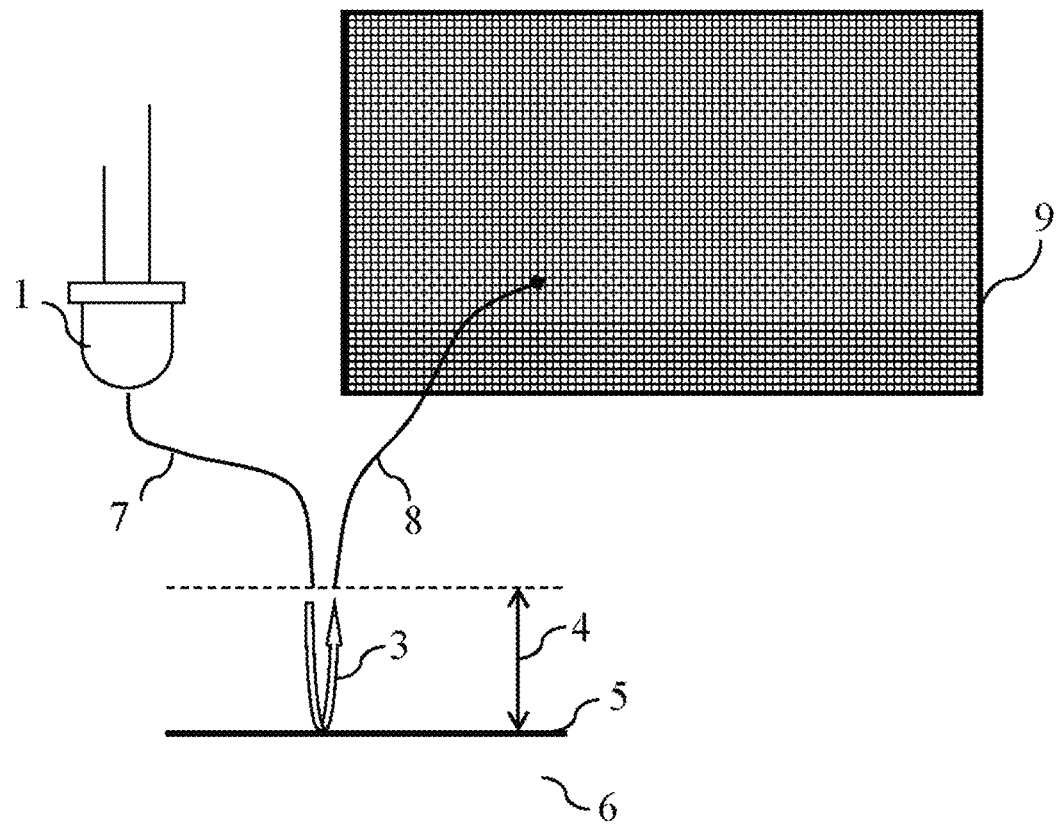
FIG. 4: Symbolical view of a CCD, CMOS etc. type of sensor being used like the receiver of the optocoupler (phototransistor).
Figure 5:
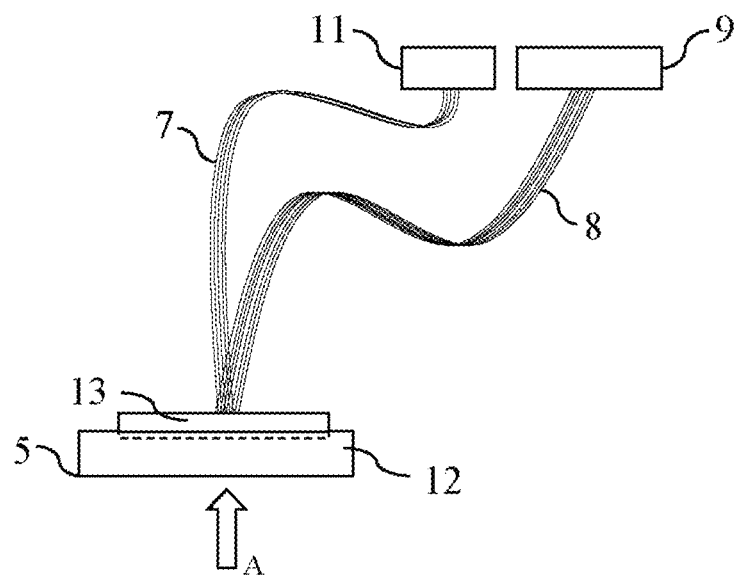
FIG. 5: General view of the system elements.
Figure 7:
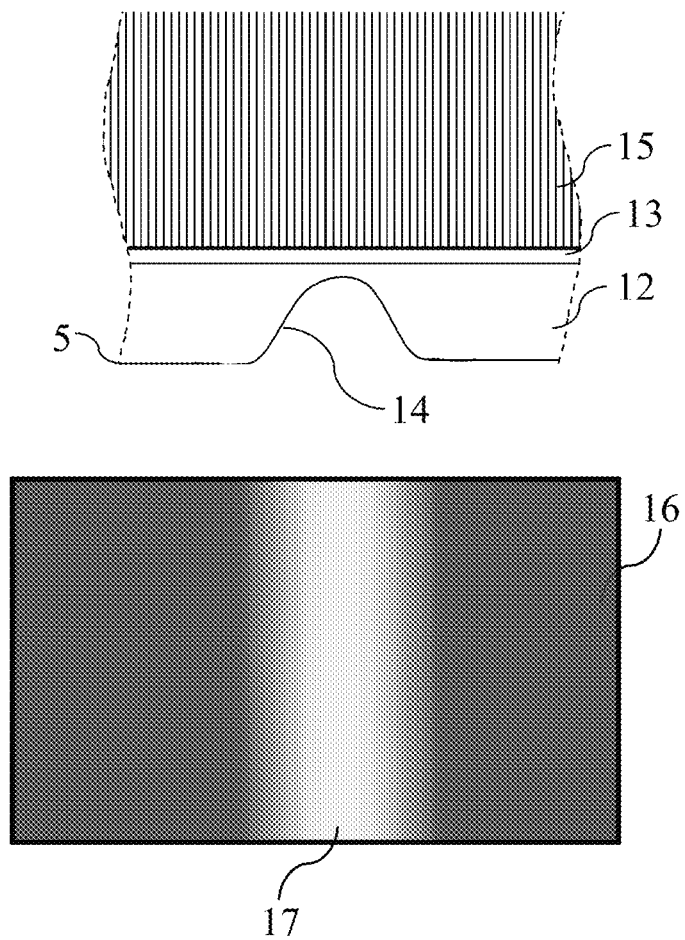
FIG. 7: The displacement that is occurred proportional to the applied force and the corresponding image.
Figure 8:
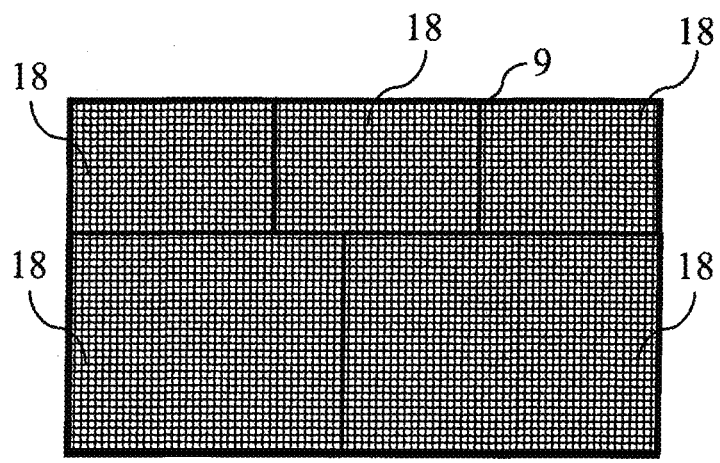
FIG. 8: Virtually establishing different areas of the sensor to different measuring areas through fiber optic cables.

Each sensory pixel (10) is able to detect 16.4 million colors in standard usage; therefore it is possible to measure the displacement precisely by the variation of light. In FIG. 4, the logic of light source (1) and the sensor (9) connection is explained, briefly. These image sensors (9) can be easily obtained by disassembling conventional webcams. An image sensor disassembled from any high definition webcam (HD—1920*1080 resolution=2.073.600 pixels) can be connected to any computer via a universal serial bus (USB) and is able to convert over two million impulses to digital data. By pairing each pixel (10) of the sensor (9) with a corresponding fiber optic cable (8) it is assured to transfer all light beams to the processor on a single photo frame where the coordinates and the level of displacements are detected precisely by the aid of image processing techniques. With the explanations till now, it is assured that millions of receptors are placed in a small reception area with precise acquisition of data at a low cost. It is also mentioned that these acquired data can be delivered to the main processing unit in one cycle. But still this is not sufficient enough for tactile sensing. At this point the system can only detect diverging and converging objects with high resolution and sensitivity but the system cannot perceive the force and the resultant tactile feeling. More, when the touching take place the light source's (7) and the receptor's (8) view will be blocked and nothing can be detected. In order to solve this issue elastic modulus (Young's Modulus) phenomenon is used. Elasticity can be imagined like a spring characteristic coefficient of the objects that are not springs. An applied force to an object will cause a stretching (shape deformation). This deformation will be proportional to the applied force if the structure of the object is not damaged irreversibly. Thus, vice versa the applied force at the point of implementation can be calculated by the amount of the shape deformation on that point (if the elasticity coefficient of the object is known). In the system, in order to mimic the human tactile sensing there is a rigid area; where fiber optic cables' tips are located and unite with the elastic area, and also prevent the unwanted level of penetration. The elastic material (12) with the same elasticity of a human flesh is covered with a layer (5) which simulates the human skin and separates the surrounding environment and guaranties the reflection of light (FIG. 5). Thus, when a penetration is occurred as in FIG. 7 the thickness of the elastic material (12) will decrease at these points (14), therefore the intensity of the reflecting light will increase (17) at that area. Each corresponding sensory pixel (10) at that area will detect the intensity of light and then with any image processing technique the level of penetration will be obtained. From the level of penetration and the elasticity coefficient of the material (12) the applied force will be calculated. Latter from the number of triggered pixels, the area of the deformation will be calculated and then by dividing the applied force to the area of deformation, the value of the pressure will be obtained. The software will decide the reaction of the robot or the device by comparing the pressure level with the threshold values that are already saved in the computer.

For instance if the penetration area is too small and the corresponding light is close to white (the intensity of light is too high) it will be understood that a needle type of a sharp body has sunk in. If so, the robot or the device will act like what it is programmed to. This will be a reflex program, meaning that the area of penetration can be drawn back.

Meanwhile if the robot or the device is needed for more heavy duties or does not need to be as sensitive as human skin, the elastic material (12) can be chosen with a less elasticity feature. Thus, the system will have a similar tactile sensing for bigger forces. After a calibration for the new material's elasticity module and light conductivity for the calculations, the new system will work.

It is known that the commercial thermal cameras are infrared cameras which measure the temperature. The color becomes brighter and whiter if the temperature increases when recording with infrared cameras. The proposed system will also measure any heat source near the detection field. It will help to protect the device or robot form high temperature because the measurement will be close to white just like sharp body penetration effect.

It is mentioned before that a sensor obtained from HD webcam contains more than two millions of pixels. A single component is able to contain more than twenty millions of pixels if a high definition digital camera is used, instead. One fingertip or any other part of human body can intensify that much of receptors. For this reason incoming fiber optic cables (8) from different sensory organs are located in virtual different areas (18) of the image sensor (9), therefore with one image sensor more than one sensory organ can be measured.

Figure 9:
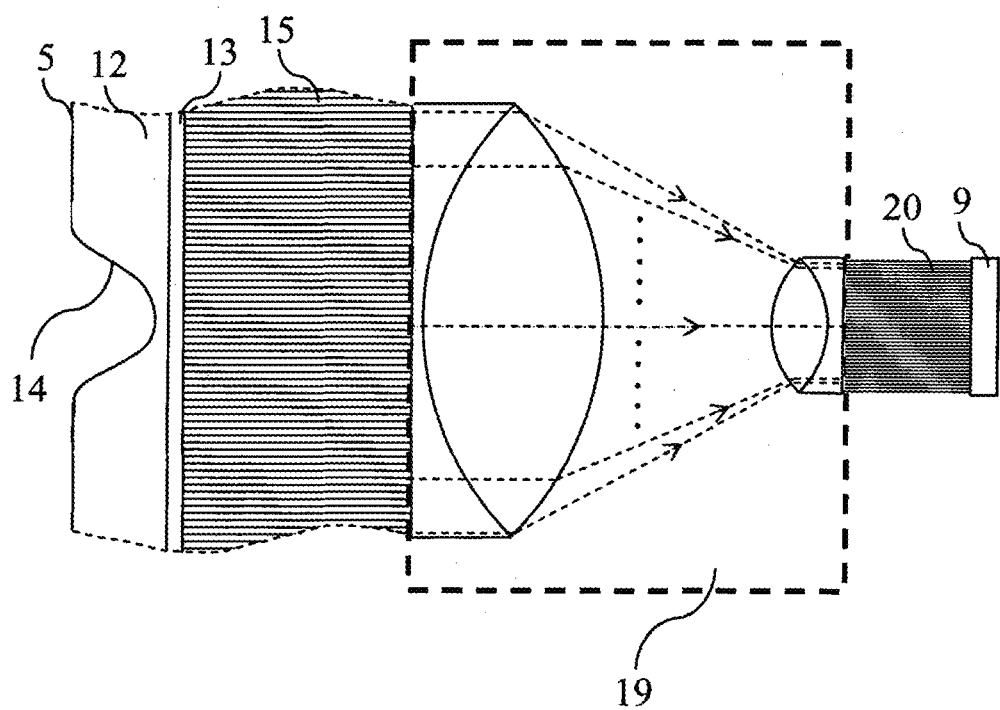
FIG. 9: Optical system that is placed between fiber optics and the receiver in the purpose to coverage the beam of light because of the possible size mismatch.

Because of the variety of the used products and fiber optic cable (15) diameters and pixel (10) dimensions do not match with each other and a problem can arises. In order to prevent this issue beams/rays of light can be converged (20) to each other as in FIG. 9 through optical system(s) (19). The used material for this optical system is also infrared conductive.

The system can work with nearly every personal computer as well as industrial computers by connecting sensors like CMOS, CCD, etc. through an electronically circuit specialized for this system to the main processor of the device or robot.

INDUSTRIAL APPLICATION

This system can answer to a lot of industrial fields that works with automation systems because the number of receptors per unit area is dramatically increased and the pressure and force values can be obtained fast.

Some outstanding application areas; robotic sensing—realizing the tactile sensing of humanoids; medical—with more receptors a better feeling of touching to the patient for remote operations (haptic); increase the sensing abilities of landmine scanning and bomb disposal robots accordingly decreasing the chance of failure and adding the temperature measurement to tactile sensing in case needed.

The invention claimed is:

1. A multi-point, high sensitive tactile sensing module for robots and devices, comprising: an elastic material, which is covered with a layer providing light reflection, wherein said layer simulates human skin; a CMOS or CCD image sensor; at least one light source; a plurality of fiber optic cables, ends of which are separated from a surrounding environment via said layer by being located under the layer and other ends of which are in connection with said light source, wherein said fiber optic cables carry light beams from the light source to said layer; another plurality of fiber optic cables, ends of which are separated from a surrounding environment via said layer by being located and being directed towards the layer and other ends of which are in connection with said image sensor so that each fiber optic cable is paired with one pixel of the image sensor, wherein light beams reflected from the layer are transferred to the image sensor by said fiber optic cables; a processor which calculates every individual force applied to the layer according to light intensity changes of each pixel connected with a fiber cable, of a photo frame generated by the image sensor in response to the displacement of the layer by using image processing techniques.

2. A multi-point, high sensitive tactile sensing module according to claim 1, wherein said elastic material has same elasticity of human flesh.

3. A multi-point, high sensitive tactile sensing module according to claim 1, wherein elasticity of said elastic material is less than elasticity of human flesh.

4. A multi-point, high sensitive tactile sensing module according to claim 1 wherein said light source is a normal/regular light source.

5. A multi-point, high sensitive tactile sensing module according to claim 1 wherein said light source is an infrared light source so as to detect temperature.

6. A multi-point, high sensitive tactile sensing module according to claim 1 wherein deformation of the elastic material is proportional to the applied force.

7. A multi-point, high sensitive tactile sensing module according to claim 1 further comprising an optical system that converges light beams transferred to the pixels of the image sensor.

* * * * *